(12) United States Patent
Kunz et al.

(10) Patent No.: US 6,404,403 B1
(45) Date of Patent: Jun. 11, 2002

(54) RADIO FREQUENCY RADIATION SHIELD UNIT FOR WIRELESS TELEPHONES

(76) Inventors: Kim R. Kunz, 6645 Morro Rd.;
Frederick J. Wood, 5950 Entrada Ave., both of Atascadero, CA (US) 93422

( * ) Notice: Subject to any disclaimer, the term of this patent is extended or adjusted under 35 U.S.C. 154(b) by 0 days.

(21) Appl. No.: 09/871,516

(22) Filed: May 30, 2001

(51) Int. Cl.[7] .................................................. H01Q 1/52
(52) U.S. Cl. ......................... 343/841; 343/702; 455/89
(58) Field of Search ................................. 343/702, 841, 343/872; 455/89, 90; H01Q 1/24, 1/52

(56) References Cited

U.S. PATENT DOCUMENTS

| | | |
|---|---|---|
| 4,472,637 A | 9/1984 | Sportelli et al. |
| 4,490,616 A | 12/1984 | Cipollina et al. |
| 4,890,199 A | 12/1989 | Beutler |
| 5,090,044 A | 2/1992 | Kabayashi |
| 5,124,889 A | 6/1992 | Humbert et al. |
| 5,150,282 A | 9/1992 | Tomura |
| 5,235,492 A | 8/1993 | Humbert et al. |
| 5,310,784 A | 5/1994 | Ide et al. |
| 5,336,896 A | 8/1994 | Katz |
| 5,373,304 A * | 12/1994 | Nolan et al. ................. 343/841 |
| 5,398,168 A | 3/1995 | Berestecky |
| 5,400,400 A | 3/1995 | Herd et al. |
| 5,550,552 A * | 8/1996 | Oxley ......................... 343/702 |
| 5,613,221 A * | 3/1997 | Hunt ............................ 455/89 |
| 5,657,386 A | 8/1997 | Schuanke |
| 5,770,534 A | 6/1998 | Hong |
| 5,826,201 A * | 10/1998 | Gratias ........................ 455/575 |
| 6,097,340 A * | 8/2000 | Chang ......................... 343/702 |

* cited by examiner

*Primary Examiner*—Tho Phan
(74) *Attorney, Agent, or Firm*—Charles C. Logan, II

(57) ABSTRACT

A Radio Frequency Radiation Shield Unit for a wireless telephone for protecting the user from radio frequency radiation. It has a housing having an open bottom end that allows it to be slid over the top end of the wireless telephone. The housing also has an aperture in its top end that allows the antenna of the phone to extend upwardly and outwardly therefrom. An antenna shield member extends upwardly from the top end of the housing and it is positioned between the antenna and the head of the person using the telephone to protect the person from radiation emitted by the antenna. In one presently preferred embodiment, the Radio Frequency Radiation Shield Unit is fabricated of a plastic material having carbon fibers embedded therein for absorbing and dispersing radio frequency radiation.

15 Claims, 2 Drawing Sheets

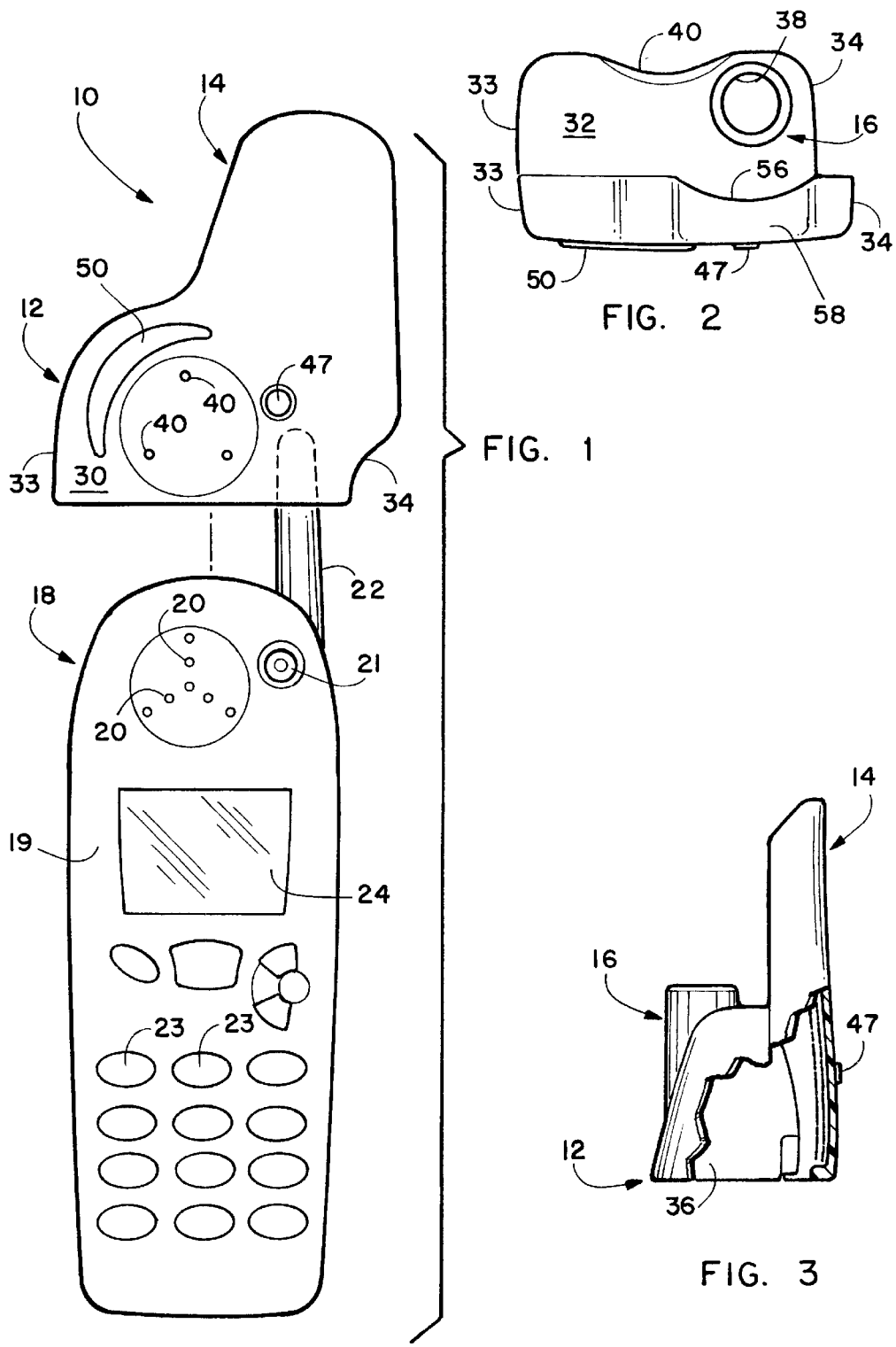

RADIO FREQUENCY RADIATION SHIELD UNIT FOR WIRELESS TELEPHONES

BACKGROUND OF THE INVENTION

The present invention is generally related to wireless telephones, and more particularly to a radio frequency radiation shielding apparatus for wireless telephones.

Wireless telephones including, but not limited to cellular telephones, digital telephones, analog telephones, PCS telephones, and personal communication systems (the new generation of wireless communication products), generate radio frequency radiation, including an electromagnetic field ("EMF"), which may prove harmful to persons exposed to such radiation. In recent years, as the number of wireless phones has grown, so has the concern about tumors or other damage to the brain. Although the level of radiation emitted by such devices is relatively low, the antenna which emits the radiation is close to the head. There is also concern that such radiation can have a cumulative effect.

There is presently pending wireless phone legislation that would require retailers to offer protective devices whenever a wireless product is sold. Such legislation would also require manufacturers and retailers to provide warning information at the point of sale.

In the past, there have been some attempts to protect user's of cellular phones from such radiation. However, none of those approaches has been entirely satisfactory. One such protective device for cellular telephone users is illustrated in the Katz U.S. Pat. No. 5,336,896. Here the entire cellular phone, including the antenna is placed in a shielding enclosure. The cell phone antenna is retracted into the shielding enclosure and makes contact with a second antenna outside the shielding enclosure. The second antenna is mounted on a tilt and swivel base so that it can be moved away from the user's head to reduce exposure to the radiation emanating from it. Even if the energy level is somewhat reduced, the head of the user is still exposed directly to the radiation.

Another prior art patent is that of Schwanke, U.S. Pat. No. 5,657,386. This patent discloses a cellular phone having a shield for protecting the user from electromagnetic radiation emanating from the antenna. The shield is pivotally mounted to the housing of the cell phone and it can be positioned between the antenna and the head of the person using the telephone to protect the person from radiation emitted by the antenna. When the shield is in its protective position, it only shields that portion of the antenna extending upwardly outside of the cell phone housing. The portion of the antenna inside the cell phone housing does not have any of the shield structure blocking radiation emanating therefrom.

It is an object of the invention to provide a novel Radio Frequency Radiation ("RFR") Shield Unit for protecting users of wireless telephones from harmful radiation.

It is also an object of the invention to provide a novel RFR Shield Unit that will slide down over the top end of existing wireless phones so that it will cover the bottom end of their antennas which are inside the housing of the wireless phones.

It is another object of the invention to provide a novel RFR Shield Unit fabricated of plastic material having carbon fibers embedded therein for absorbing and dispersing radiation.

It is a further object of the invention to provide a novel RFR Shield Unit that is easily and quickly installed or removed from existing wireless phones.

It is an additional object of the invention to provide a novel RFR Shield Unit for wireless telephones that is economical to manufacture and market.

It is also an object of the invention to provide a novel RFR Shield Unit that has a grounding member located on its outer surface where it can contact the ear or head of the person using the wireless telephone.

SUMMARY OF THE INVENTION

The Radio Frequency Radiation ("RFR") Shield Unit for a wireless telephone has an upright oriented housing whose bottom end is open so that the top end of a wireless telephone may be received therein. The height of the chamber in the housing of the unit is such that the lower end of the housing extends downwardly over that portion of the antenna of the wireless phone that is located within the housing of the phone itself. An aperture is formed in the top end of the housing of the RFR Shield Unit that communicates with its chamber for allowing the antenna on the top end of a wireless telephone to extend out of the housing.

An antenna shield member extends upwardly from the top end of the housing and is located forwardly of the aperture in the housing so that it will intercept radiation that would be emitted from the antenna of a wireless telephone directed toward the head of the user of such a telephone. The rear surface of the antenna shield member has a concave surface that extends parallel to the antenna of the wireless phone and this concave surface receives and disperses the radiation from the antenna of the cell phone in an extremely effective manner. In one presently preferred embodiment, the housing and the antenna shield member are fabricated of a plastic material having carbon fibers embedded therein for absorbing and dispersing radiation. Also in the preferred embodiment, the RFR Shield Unit is formed from two members, a front cover member and a rear cover member. A plurality of membranes are positioned between the rear surface of the front cover member and the front surface of the rear antenna member for intercepting any radiation that passes through any of the apertures in the front wall of the front cover member. These membranes are made of carbon fiber material that has been cut into strips and tightly woven together. The combined structure of the membrane members and the carbon fiber impregnated plastic material structure of the RFR Shield Unit has been successful in blocking the transmission of better than 96% of the radio frequency radiation emanating from the antenna of a wireless phone. This is a remarkable achievement that is superior to anything presently in the marketplace.

A grounding member is located on the front surface of the housing and has prongs extending from its rear surface that seat right into the carbon fabric of the membranes positioned within the interior of the antenna shield member. The carbon fiber deflects much of the radio frequency radiation. Some of the RFR is absorbed by the carbon fiber and directed into a flow of electrons. These electrons then flow into the grounding member through its prongs. When the user of the wireless phone places it in contact with their ear or head, their body absorbs some of this harmless energy. In the preferred embodiment, the grounding member is made of brass and its outer surface is covered by a layer of gold. It provides excellent conductivity.

DESCRIPTION OF THE DRAWINGS

FIG. 1 is an exploded front elevation view of the RFR Shield Unit and a cellular telephone;

FIG. 2 is a top plan view of the RFR Shield Unit;

FIG. 3 is a left side elevation view of the RFR Shield Unit with portions broken away;

DESCRIPTION OF THE PREFERRED EMBODIMENT

Figure 4:
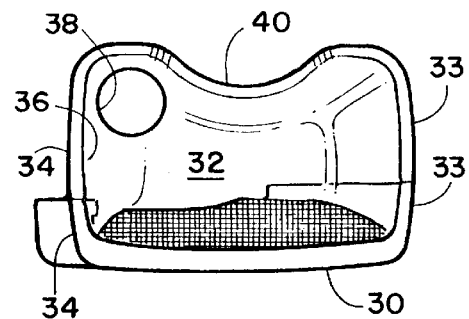
FIG. 4 is a bottom plan view of the RFR Shield Unit.

The Radio Frequency Radiation Shield Unit for a wireless telephone will now be described by referring to FIGS. 1–6 of the drawings. The RFR Shield Unit is generally designated numeral 10. Its major components are a housing 12, an antenna shield member 14 and a tubular sleeve 16. The RFR Shield Unit 10 is shown slid over the top end of cellular phone 18.

Cellular telephone 18 has a body consisting of a housing 19 which contains the usual radio frequency transmitter and receiver employed in such devices. On the front side of the housing are ports 20 for the ear piece speaker and an on/off button 21 for turning on the power to the cellular telephone. An antenna 22 extends upwardly from the top end of housing 19. A key pad 23 and a display window 24 are also formed on the front of housing 19. Antenna 22 is connected to the transmitter and receiver located in the housing for transmitting and receiving radio frequency radiation.

Housing 12 has a front wall 30, a rear wall 31, a top wall 32, a left side wall 33, and a right side wall 34 that combined form a chamber 36 therein. An aperture 38 is formed in the top end of housing 12 and it communicates with chamber 36 for allowing the antenna on the top end of cellular telephone 18 to extend out of housing 12. Tubular sleeve 16 has its bottom end connected to aperture 38. The inner surface of tubular sleeve 16 tapers slightly from its bottom end to its top end so that it rigidly engages the top end of antenna 22 as it is slid upwardly therethrough to prevent accidental removal of the RFR Shield Unit from cellular phone 18. Rear wall 31 of housing 12 has a recess 40 formed in its bottom edge contoured to match up with the rear wall of cellular telephone 18.

Figure 5:
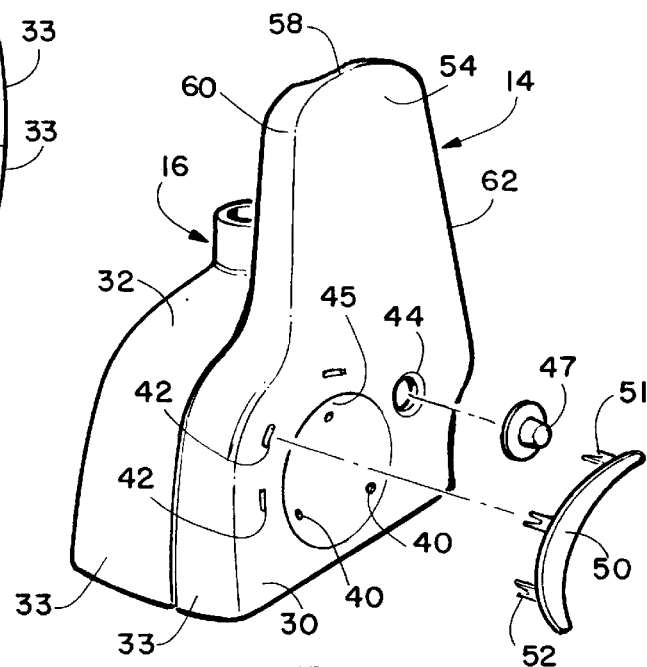
FIG. 5 is an exploded front perspective view of the RFR Shield Unit illustrating the manner in which the grounding member and on/off flash button are connected thereto.
Figure 6:
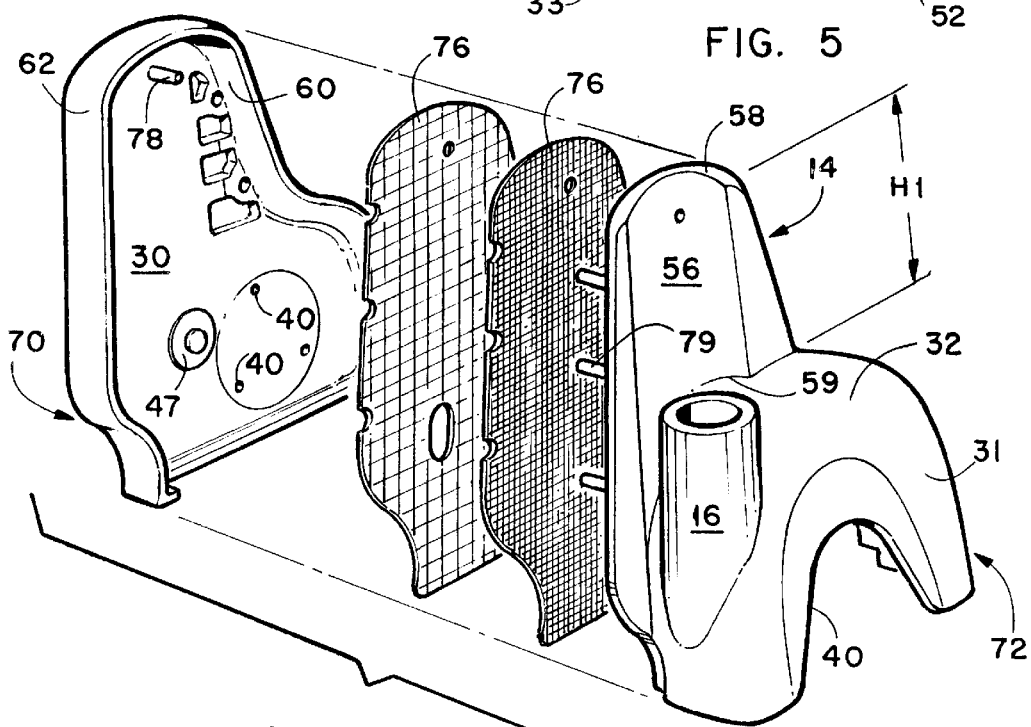
FIG. 6 is an exploded rear perspective view of the RFR Shield Unit.

Referring to FIG. 5, front wall 30 has a plurality of speaker apertures 40, a plurality of slots 42, an aperture 44 and a concave recess 45. On/off button 47 has an annular flange on its rear end and it is inserted from the rear of front wall 30 through aperture 44. Button 47 aligns with the on/off switch 21 of the cellular telephone 18. A crescent-shaped grounding member 50 has a plurality of prongs 51 extending from its rear surface that pass through slots 42. In the preferred embodiment, grounding member 50 is made of brass with a covering of copper that in turn is covered with a layer of gold.

Antenna shield member 14 has a front wall 54, a rear wall 56, a top end 58, a bottom end 59, a left side 60 and a right side 62. Rear wall 56 has a concave surface that extends along its vertical longitudinal axis. Its curvature is important in the manner in which it receives the radiation from antenna 22 and the manner in which it distributes radiation throughout the rear surface of antenna shield member 14.

In the preferred embodiment, RFR Shield Unit 10 is formed of two molded pieces, namely a front cover member 70 and a rear cover member 72. In the preferred embodiment, both of these members are fabricated of a plastic material having carbon fibers embedded therein for absorbing, deflecting and dispersing radio frequency radiation emitted by the antenna of a wireless telephone. Antenna shield 14 has a height HI that is at least as great or greater than the height of the antenna 22 of the cellular phone 18. A pair of membranes 76 are attached to the rear surface of the front wall of the combined structure of the housing and the antenna shield member. The top end of the rear surface of front wall curves rearwardly toward rear wall 56 so that the top ends of the respective membranes also curve rearwardly. This structure functions like a sea wall that directs the radio frequency radiation rearwardly and keeps it from leaking over the top edge of the membranes toward the user's ear or head. Membrane's 76 are made of carbon fiber material that t0 has been cut into strips and tightly woven together and captured with a resin bonding agent. Pins 78 and 79 extending outwardly from the rear surfaces of the respective front cover member 70 and rear cover member 72 help to align the respective membranes 76. These membranes absorb, disperse and deflect the radiation from passing through front wall 30 and the respective apertures 40, 42 and 44 in the front wall of the RFR Shield Unit 10. The prongs 52 of grounding member 50 form a good ground contact with both membranes 76.

What is claimed is:

1. A Radio Frequency Radiation Shield Unit for a wireless telephone comprising:

an upright oriented housing having a front wall, a rear wall, a left side wall, a right side wall and a top wall that combined form a chamber therein; said housing having a top end and a bottom end, said bottom end of said housing being open so that the top end of the wireless telephone may be received in said chamber;

an aperture in said top end of said housing that communicates with said chamber of said housing for allowing an antenna on the top end of the wireless telephone to extend out of said housing; and an antenna shield member having a front wall, a rear wall, a left side, a right side, a top end, a bottom end and a predetermined height H1; said bottom end of said antenna shield being connected to said top end of said housing; said antenna shield being located forwardly of said aperture in said housing so that said antenna shield would intercept radio frequency radiation that would be emitted from the antenna of the wireless telephone toward the head of the user of the telephone.

2. A Radio Frequency Radiation Shield Unit as recited in claim 1 wherein said housing and antenna shield member are fabricated of a plastic material having carbon fibers embedded therein for absorbing and dispersing radiation emitted by the antenna of the wireless telephone.

3. A Radio Frequency Radiation Shield Unit as recited in claim 1 wherein said combined housing and antenna shield are formed from a front cover member and a rear cover member.

4. A Radio Frequency Radiation Shield Unit as recited in claim 1 further comprising an upright extending tubular sleeve having a top end and a bottom end, said bottom end being connected to said aperture in said top end of said housing so that the antenna on the wireless telephone can pass upwardly through said tubular sleeve and extend outwardly therefrom.

5. A Radio Frequency Radiation Shield Unit as recited in claim 1 further comprising a metallic grounding member attached to said front wall of said housing for contacting the ear of a person using the wireless telephone.

6. A Radio Frequency Radiation Shield Unit as recited in claim 5 wherein said metallic grounding member has a front surface covered with a gold coating layer.

7. A Radio Frequency Radiation Shield Unit as recited in claim 5 wherein said metallic grounding member has a crescent shape.

8. A Radio Frequency Radiation Shield Unit as recited in claim 1 wherein said front wall of said housing has a concave speaker recess having at least one aperture therein.

9. A Radio Frequency Radiation Shield Unit as recited in claim 8 wherein said front wall of said housing has an aperture and received therein is an on/off button for operating the wireless telephone when its top end has been inserted into said bottom end of said housing.

10. A Radio Frequency Radiation Shield Unit as recited in claim 1 wherein said rear wall of said antenna shield member has a concave surface that would face the antenna of the wireless telephone when its top end has been inserted into said bottom end of said housing.

11. A Radio Frequency Radiation Shield Unit as recited in claim 1 wherein said rear wall of said housing has a recess formed in its bottom edge contoured to match up with the rear wall of the wireless telephone.

12. A Radio Frequency Radiation Shield Unit as recited in claim 1 further comprising at least one membrane positioned between said rear wall of said antenna shield member and said front wall of said antenna shield member.

13. A Radio Frequency Radiation Shield Unit as recited in claim 12 wherein said membrane is made of carbon fiber material.

14. A Radio Frequency Radiation Shield Unit as recited in claim 13 wherein said carbon fiber material has been cut in strips and woven together.

15. A Radio Frequency Radiation Shield Unit as recited in claim 1 in combination with the wireless telephone having a top end that is removably received in said bottom end of said housing.

* * * * *